(12) United States Patent
Tschaeschke

(10) Patent No.: US 6,189,917 B1
(45) Date of Patent: Feb. 20, 2001

(54) WINDOW AIR BAG MODULE FOR A PASSENGER VEHICLE

(75) Inventor: Ulrich Tschaeschke, Ehningen (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/427,688

(22) Filed: Oct. 27, 1999

(30) Foreign Application Priority Data

Oct. 27, 1998 (DE) .............................. 198 49 490

(51) Int. Cl.[7] .................................. B60R 21/20
(52) U.S. Cl. .................... 280/728.3; 280/730.2; 280/751
(58) Field of Search .............. 280/728.1, 728.2, 280/728.3, 730.1, 730.2, 751

(56) References Cited

U.S. PATENT DOCUMENTS

| | | | |
|---|---|---|---|
| 5,382,051 | * | 1/1995 | Glance ................... 280/751 |
| 5,575,500 | * | 11/1996 | Mimura et al. ............. 280/751 |
| 6,079,732 | * | 6/2000 | Nakajima et al. ............ 280/728.2 |
| 6,095,593 | * | 8/2000 | Johann et al. ............ 280/751 |

FOREIGN PATENT DOCUMENTS

| | | |
|---|---|---|
| 297 16 793 U1 | 3/1998 | (DE). |
| 19838641A1 | 4/1999 | (DE). |

* cited by examiner

Primary Examiner—Kevin Hurley
Assistant Examiner—Lynda Jasmin
(74) Attorney, Agent, or Firm—Evenson, McKeown, Edwards & Lenahan, P.L.L.C.

(57) ABSTRACT

The invention relates to an air bag module in a motor vehicle with a folded air bag, in particular a window bag, located in a lengthwise container on a vehicle frame part, particularly a roof frame part, and which is inflated and unfolded in the event of a collision, and with an energy-absorbing element mounted in or on container. According to the invention, energy-absorbing element is designed in several parts. A first part of energy-absorbing element is permanently mounted in or on container or vehicle frame part and serves to guide air bag as it inflates and unfolds. A second part of energy-absorbing element is pivotably mounted in or on container.

6 Claims, 2 Drawing Sheets

WINDOW AIR BAG MODULE FOR A PASSENGER VEHICLE

BACKGROUND AND SUMMARY OF THE INVENTION

This application claims the priority of German application 198 49 490.4, filed in Germany on Oct. 27, 1998, the disclosure of which is expressly incorporated by reference herein.

The invention relates to an air bag module in a motor vehicle with a folded air bag, particularly a window bag, located in a lengthwise container on a vehicle frame part, particularly a roof frame part, and which inflates and unfolds in the event of a collision and with an energy-absorbing element located in or on the container.

With an air bag module of this type, as described in German Patent Document No. DE 198 38 641, not pre-published, it has been shown to be disadvantageous for the energy-absorbing part to impede the unfolding of the air bag. It has thus been proposed that additional ramps be installed in the area of the D- and C-pillars to guide the air bag as it unfolds.

In addition, a gas bag restraint system for vehicle occupants is known from German Patent Document No. DE 297 16 793 U1, in which an inner wall of the container and/or a flap of the container is formed as an energy-absorbing body. In this case, the energy-absorbing body is designed overall as a closed body. Numerous ribs are formed on the outer wall of the container to guide a firing channel formed in the container. With this gas bag restraint system, the weight of the energy-absorbing body must be swung out together with the flap when the gas bag is triggered. The resulting delay is undesirable.

A goal of the invention is to overcome the above-described disadvantages. In particular, a goal is to optimize inflation and unfolding of the air bag.

With an air bag module in a motor vehicle, with a folded air bag, in particular a window bag, located in a lengthwise container on a vehicle frame part, particularly a roof frame part, and which is inflated and unfolded in the event of a collision, and with an energy-absorbing element mounted in or on the container, this goal is achieved by the fact that the energy-absorbing element is designed in several parts and has at least a first part, which is permanently mounted in or on the container or the vehicle frame part and serves to guide the air bag as it inflates and unfolds, and at least a second part that is pivotably mounted in or on the container. The multipart design of the energy-absorbing element reduces the weight moved as the air bag is inflated and unfolded. Moreover, there is no need for additional guide ramps for the air bag.

Certain preferred embodiments of the invention are characterized in that a guide surface with a specific contour is formed on the first part of the energy-absorbing element. The guide surface makes proper unfolding of the air bag possible. It is also contemplated to form a guide surface on the second part of the energy-absorbing element in certain preferred embodiments of the invention.

Certain preferred embodiments of the invention are characterized in that the first and the second parts of the energy-absorbing element have the shape of semicylinders with flat interfaces. The flat interfaces of the first part of the energy-absorbing element can face in any direction as required.

Certain preferred embodiments of the invention are characterized in that the first and the second parts of the energy-absorbing element have the shape of semicylinders with interfaces curved in a mutually complementary manner. The curvatures of the interfaces make the direction change a gentle one.

Certain preferred embodiments of the invention are characterized in that the energy-absorbing element has the shape of a cylinder with a flat area that extends over the entire length of the cylinder and forms a cover for the container, in that the first part of the energy-absorbing element is a segment of a circle in cross section and has an interface with a concave curvature, and in that the second part of the energy-absorbing element comprises the total flat area and has a surface with a convex curvature complementary to the curved interface of the first part of the energy-absorbing element. The flat area on the second part of the energy-absorbing element forms a closure for the container. When the second part swings away, it leaves the entire container opening free. Nonetheless, the concavely curved interface of the first part of the energy-absorbing element ensures that the air bag is guided as it unfolds.

Certain preferred embodiments of the invention are characterized in that the first and the second part of the energy-absorbing element have the shape of a segment of a circle in cross section with an interface that has a convex curvature, and in that the first and second parts of the energy-absorbing element are disposed with respect to each other such that a funnel-shaped opening directed toward the folded air bag is formed between the two parts. The funnel-shaped opening between the two parts of the energy-absorbing element makes it possible to fold up the air bag more gently.

Other advantages, features, and details of the invention will be found in the description below in which a number of embodiments of the invention are described in detail with reference to the drawings. The features referred to in the claims and the specification may be important to the invention individually or in any combination.

DETAILED DESCRIPTION OF THE DRAWINGS

Figure 1:
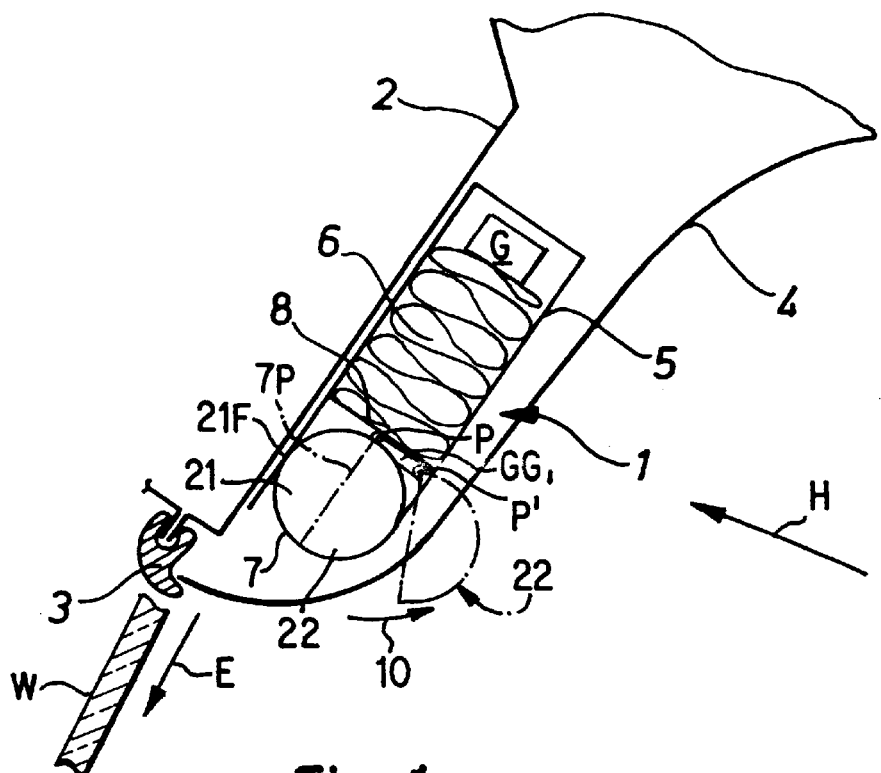
FIG. 1 is a schematic perspective view which shows an air bag module according to preferred embodiments of the present invention in the installed state.

FIG. 1 shows schematically an air bag module designated overall by 1, attached to a roof frame part 2. A profile strip 3, from which a headliner 4 extends, is mounted on roof frame part 2. Headliner 4 covers air bag module 1.

Air bag module 1 comprises a container 5 in which a folded window bag 6 is located. One end of window bag 6 is connected to a schematically depicted gas generator GG. The free end, designated 8, of the folded window bag 6 faces an energy-absorbing element 7.

The window bag 6, when inflated, is guided in the direction of arrow E along the schematically shown side window W. The bag 6 is guided to move between the first part 21 and the second part 22 of the energy absorbing element 7 along the separating section depicted schematically as separating plane or junction 7P in FIG. 1. The first part 21 of the absorbing element 7 is fixed to the container 5 or the roof frame part at the schematically depicted fixing connection 21F. The second part 22 of the absorbing element 7 is pivotally mounted at a pivot connection P which is slidably movable to position P' in a guide G, and pivotally movable to a position 22' schematically depicted in dash lines in FIG. 1, thereby accepting and guiding movement of an inflating air bag between the parts 21 and 22 (22').

The purpose of energy-absorbing element 7 is to gently catch the occupant, particularly in the event of a collision, when window bag 6 has not yet been triggered. Energy is absorbed primarily during the plastic deformation of energy-absorbing element 7 and the occupant is less stressed by the impact. Energy-absorbing element 7 can be formed from a correspondingly plastically deformable foamed body. In use the occupant head would move in a direction generally schematically depicted by arrow H in FIG. 1 to engage the energy-absorbing element 7.

Figure 2:
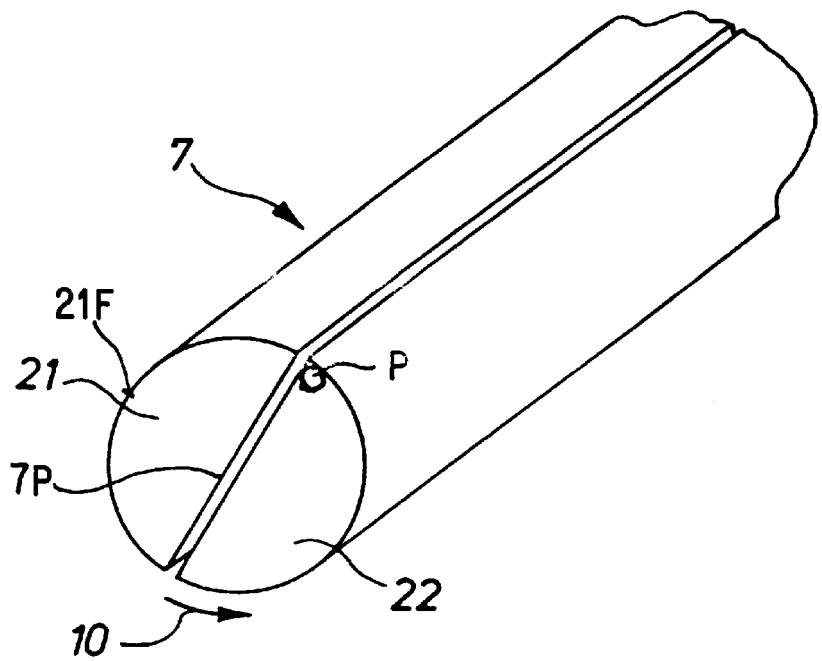
FIG. 2 is a schematic perspective view which shows an energy-absorbing element of an air bag module according to a first embodiment of the present invention.

FIG. 2 shows a first embodiment of an energy-absorbing element 7 which is formed as a vertical regular cylinder divided into two identical parts 21 and 22. The first part 21 of energy-absorbing element 7 is attached to container 5 at connection location 21F schematically depicted in FIG. 1. Alternatively, the first part 21 of energy-absorbing element 7 can be attached to roof frame part 2. The interface along 7P of the semicylindrical first part of energy-absorbing element 7 serves to guide air bag 6 as it unfolds in pivoting second part 22 about pivot P as schematically depicted by arrow 10.

Figure 3:
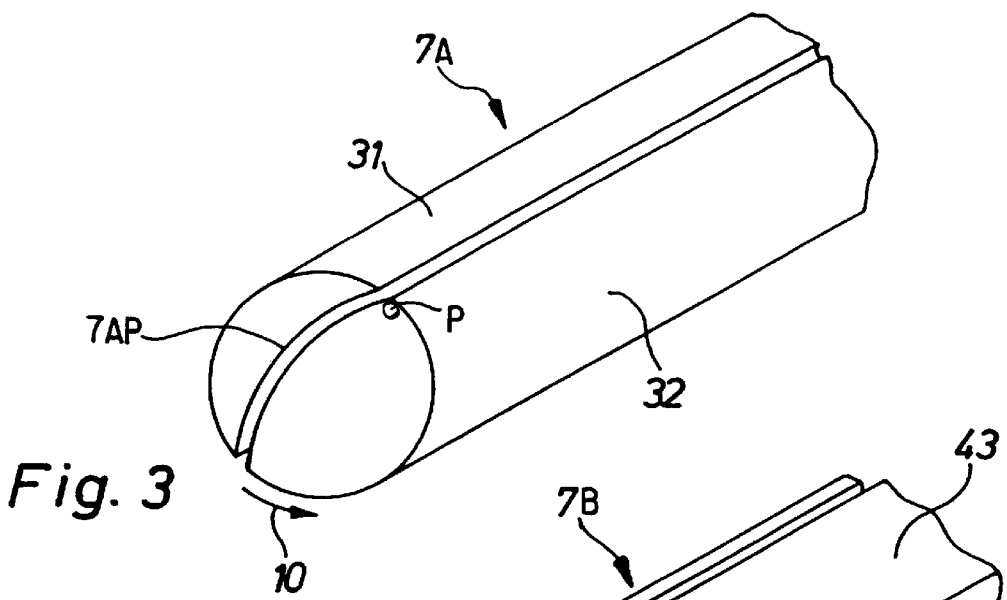
FIG. 3 is a schematic perspective view which shows an energy-absorbing element of an air bag module according to a second embodiment of the present invention.

FIG. 3 shows a second embodiment of an energy-absorbing element 7A which is generally similar to the energy-absorbing element 7 shown in FIG. 2. By contrast to the embodiment shown in FIG. 1, energy-absorbing element 7A in FIG. 3 has curved interfaces at dividing junction or interface 7AP. This curved interface facilitates further deflection of window bag 6 as it unfolds. The pivot P moves along a guide similar to guide G depicted in FIG. 1 and facilitates separation of the parts 31 and 32 while pivoting about pivot P as depicted by arrow 10.

Figure 4:
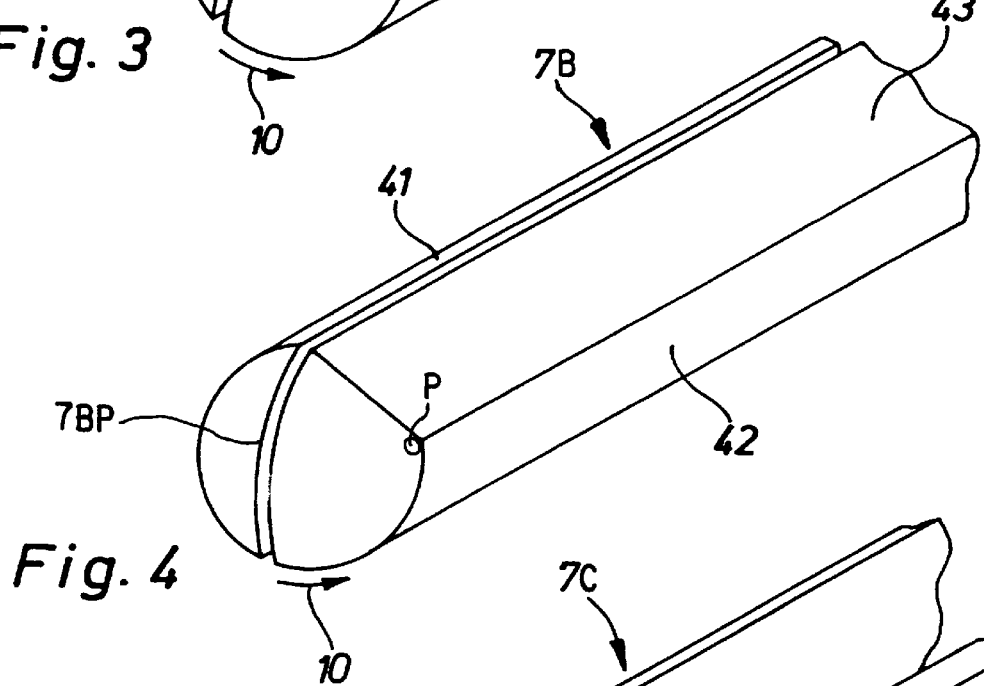
FIG. 4 is a schematic perspective view which shows an energy-absorbing element of an air bag module according to a third embodiment of the present invention.

The energy-absorbing element 7B shown in FIG. 4 is similar to element 7A of FIG. 3 in that it is formed by a vertical regular cylinder divided in two parts 41 and 42. The cross section of first part 41 is in the shape of a segment of a circle and its interface (7BP) is curved, serving as a guide surface when the air bag unfolds. The second part 42 is provided with a flat area 43. Flat area 43 forms a supporting surface for free end 8 of folded window bag 6. The pivot P is schematically depicted at an edge of the flat area 43. Otherwise this embodiment operates similarly to the other embodiments.

Figure 5:
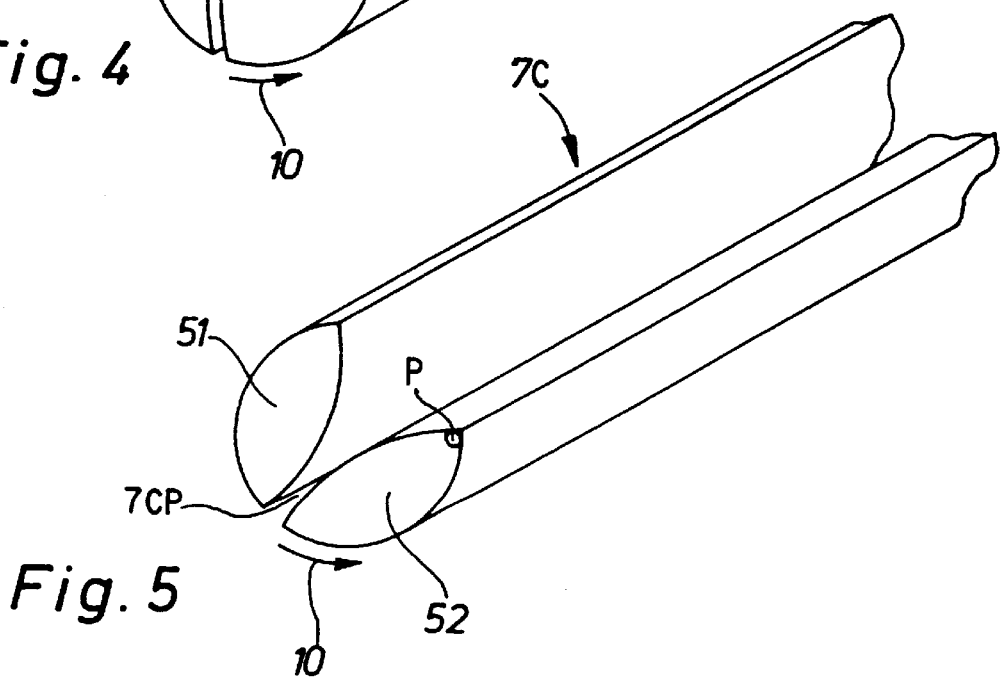
FIG. 5 is a schematic perspective view which shows an energy-absorbing element of an air bag module according to a fourth embodiment of the present invention.

The energy-absorbing element 7G shown in FIG. 5 is formed from two parts 51 and 52. The cross sections of parts 51 and 52 are in the shape of a segment of a circle and their interfaces are curved. The two interfaces with convex curvatures are so arranged opposite one another that they form a funnel-shaped recess. Window bag 6 in its folded state abuts this funnel-shaped recess. The pivot P is at the edge of the part 52 and the part 52 pivots about this pivot P when the bag is inflated and pressed between the parts 51 and 52.

The second parts 22, 32, 42, and 52 of the above-described embodiments of energy-absorbing elements 7, 7A, 7B, 7C are swivellably attached to container 5 (see FIG. 1). When air bag module 1 is triggered, second part 22, 32, 42, and 52 swings out in the direction depicted by arrow 10 and clears the path for window bag 6 to unfold. First part 21, 31, 41, and 51 remains in position, with the interface 7P, 7AP, 7BP, 7CP serving as a guide surface as window bag 6 unfolds.

In the embodiments of FIGS. 4 and 5, the pivot P can be fixed to the container and the guide G of FIG. 1 could then be dispensed with or at least shortened.

When triggered, the window bag unfolds in the desired direction due to the specified contour of the energy-absorbing element, without additional ramps being required on the body-in-white or on trim parts. In a collision when the air bag module is triggered, the window bag is filled with gas from a gas generator and unfolds. The window bag extends downward over the side windows W of the vehicle like a protective curtain (FIG. 1). This cushions the impact of an occupant against the side window.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Air bag module in a motor vehicle, comprising:
    a folded window air bag located in a lengthwise container on a vehicle frame roof part, and which is inflated and unfolded in an event of a collision, and
    an energy-absorbing element mounted in or on the container,
    wherein the energy-absorbing element is designed in plural parts and has at least a first part which is permanently mounted in or on the container or the vehicle frame part and serves to guide the air bag as it inflates and unfolds, and at least a second part that is pivotably mounted in or on the container.

2. Air bag module according to claim 1, wherein a guide surface with a specific contour is formed on the first part of the energy-absorbing element.

3. Air bag module according to claim 2, wherein the first and the second parts of the energy-absorbing element have the shapes of semicylinders with flat interfaces.

4. Air bag module according to claim 2, wherein the first and second parts of the energy-absorbing element have the shapes of semicylinders with interfaces whose surfaces have complementary curvatures.

5. Air bag module according to claim 2, wherein the energy-absorbing element is in a shape of a cylinder with a flat area that extends over an entire length of the cylinder and covers the container,
    wherein the first part of the energy-absorbing element is a segment of a circle in cross section and has an interface with a concave curvature, and
    wherein the second part of the energy-absorbing element comprises the total flat area and has a surface with a convex curvature complementary to the curved interface of the first part of the energy-absorbing element.

6. Air bag module according to claim 2, wherein the first and the second part of the energy-absorbing element have the shape of a segment of a circle in cross section with an interface that has a convex curvature, and
    wherein the first and second part of the energy-absorbing element are disposed with respect to each other such that a funnel-shaped opening directed toward the folded air bag is formed between the two parts.

* * * * *